United States Patent [19]

Gutterman et al.

[11] Patent Number: 5,297,031
[45] Date of Patent: Mar. 22, 1994

[54] METHOD AND APPARATUS FOR ORDER MANAGEMENT BY MARKET BROKERS

[75] Inventors: Burton J. Gutterman, Glencoe; John J. Brogan, Palatine; Thomas Palenik, Oak Forest; Dolores Panek, St. Charles; Shirley Wu, Roselle, all of Ill.

[73] Assignee: Chicago Board of Trade, Chicago, Ill.

[21] Appl. No.: 489,196

[22] Filed: Mar. 6, 1990

[51] Int. Cl.⁵ .............................................. G06F 15/20
[52] U.S. Cl. ...................................... 364/408; 364/406
[58] Field of Search ........................ 364/408, 412, 406

[56] References Cited

U.S. PATENT DOCUMENTS

| | | | |
|---|---|---|---|
| 4,677,552 | 6/1987 | Sibley, Jr. | 364/408 |
| 4,760,527 | 7/1988 | Sidley | 364/412 |
| 4,903,201 | 2/1990 | Wagner | 364/408 |
| 4,942,616 | 7/1990 | Linstroth et al. | 364/408 |
| 4,980,826 | 12/1990 | Wagner | 364/408 |
| 5,038,284 | 8/1991 | Kramer | 364/408 |
| 5,101,353 | 3/1992 | Lupien et al. | 364/408 |

OTHER PUBLICATIONS

"Unisys introduces PC-based quotation system for stockbrokers at Securities Industry trade show in New York", Feb. 10, 1988, article from Dialog File 649—Newswire ASAP ®.
"GTE Telenet and Reveal Software Inc. have cooperated in developing a complete broker's workstation software package", Jan. 22, 1985, article from Diaglog File 649–Newswire ASAP ®.
Bucken, M. "Stock traders ponder Make or Buy choice", *Software Magazine*, vol. 9, No. 15, Dec. 1989, 75-77. (abstract of article).
Mazzella, D. P. "Workstations for financial services professionals", *Wall Street Computer Review*, vol. 3, No. 8, May 1986, 51-58 (abstract of article).
Nathans, L. "Can computers help Merrill take possession of the field?", *Wall Street Computer Review*, vol. 3, No. 5, Feb. 1986, 35-39 (abstract of article).
"Software alliance unveils system to help banks trade securities", *American Banker*, Nov. 17, 1987, 14 (abstract of article).
"StarLAN chosen to link Hutton branches", *PC Week*, May 12, 1987, c241, (abstract of article).
"Unisys: Unisys broadens commitment to securities industry with snapnet back office administrative system", Nov. 7, 1989, article from Diaglog File 610–Businesswire.
Lyons, D. J. "Brokers tuning in to intelligent workstations", *PC Week*, vol. 4, Oct. 6, 1987, 187.
"Stratus to use Apollo's network computing system to link workstations, OLTP computers", Apr. 26, 1988, article from Diaglog File 610–Businesswire.
"SAEF 2. Product Overview," (date unknown).
I. Schmerken, "How Computer Assisted Trading is Making the Toronto Stock Exchange Purr," *Wall Street Computer Review*, (Dec. 1987) pp. 71-78, 97.
Anon., "SOFFEX Management Summary," *Swiss Options and Financial Futures Exchange Ltd.* (1987).

*Primary Examiner*—Roy Envall
*Assistant Examiner*—Frantzy Poinvil
*Attorney, Agent, or Firm*—Kirkland & Ellis

[57] ABSTRACT

There is provided a broker workstation for managing orders in a market for trading commodities, securities, securities options, futures contracts and futures options and other items including: a device for selectively displaying order information; a computer for receiving the orders and for controlling the displaying device; and a device for entering the orders into the computer; wherein the displaying device comprises a device for displaying selected order information about each incoming order, a device for displaying a representation of an order deck and a device for displaying a total of market orders. In another aspect of the invention, there is provided in a workstation having a computer, a device for entering order information into the computer and a device for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price.

13 Claims, 8 Drawing Sheets

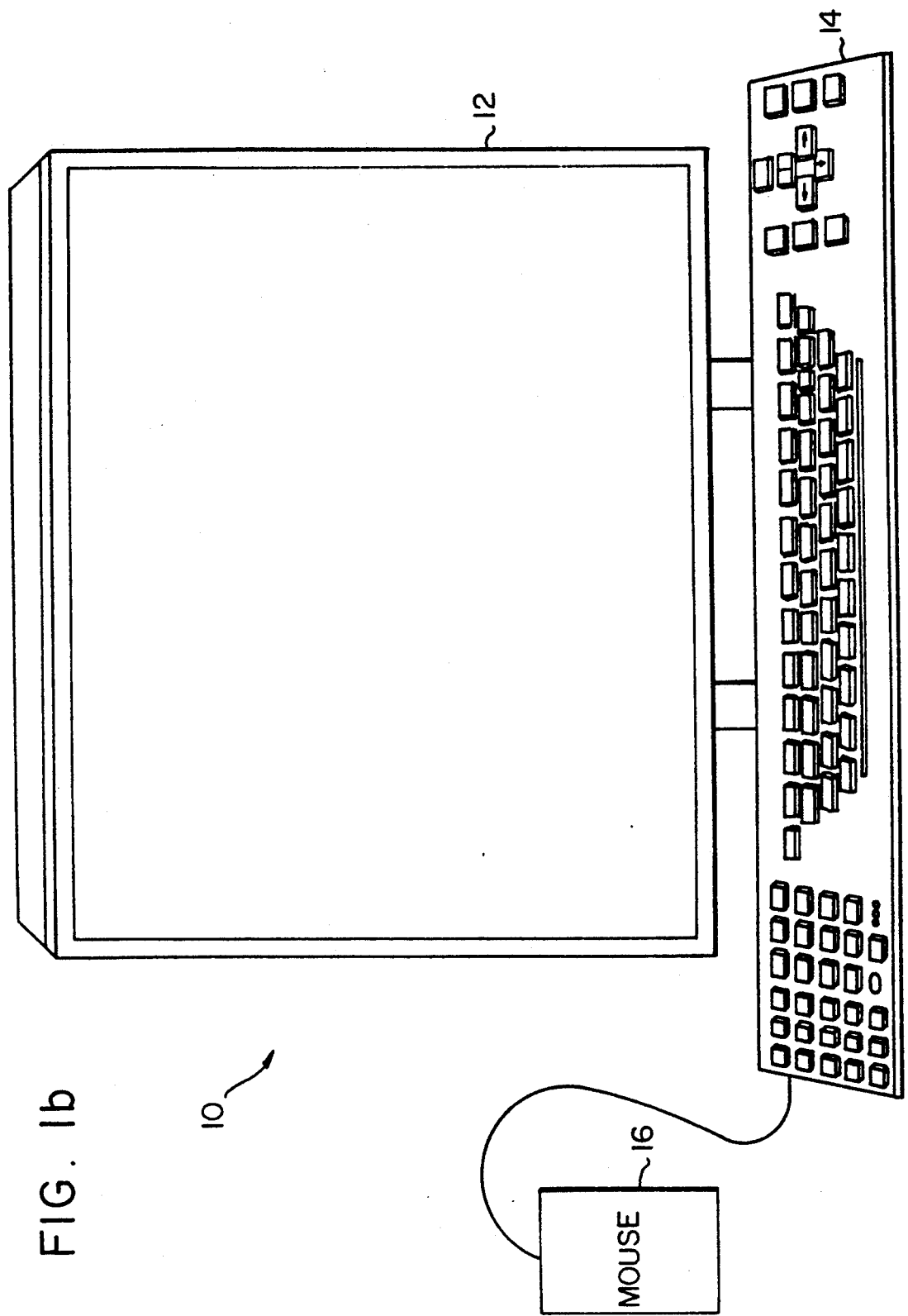

METHOD AND APPARATUS FOR ORDER MANAGEMENT BY MARKET BROKERS

BACKGROUND OF THE INVENTION

The present invention relates to computer-based techniques for managing orders placed in a physical market for trading instruments such as stocks, bonds, stock options, futures options and futures contracts on commodities including agricultural products, financial instruments, stock market indices and the like.

A futures contract is an agreement providing for the future delivery of a fixed quantity of a commodity under conditions specified by a federally designated exchange. In general, that contract is a firm legal agreement between a buyer and seller to make or take delivery of the underlying commodity and is cleared by a separate clearinghouse.

The futures exchanges house centralized auction markets (called designated contract markets) where standardized contracts for future delivery of specified quantities of commodities are bought and sold by open outcry. The open outcry method of auction trading is widely believed to be the best method of buying and selling goods because of the fast access to the market it provides to all prospective traders. It is important to note that the exchanges themselves do not trade futures contracts, nor do they set prices at which contracts are traded. They merely furnish a place where market participants and their brokerage representatives can meet to trade futures contracts.

Trading generally takes place in a pit or around the outside of a ring. All orders received by exchange member firms are transmitted to the exchange floor for execution and are filled according to bids and offers in the respective pits by open outcry to all members present at the time. Only one instrument or commodity is traded in a pit or around a ring unless the volume is too small to justify so much space. Customarily, those trading the same contract delivery month gather in the same area of the ring or on the same step of the pit so that a broker with an order can locate the particular market as quickly as possible.

Transactions on the trading floor must be reported to the membership and the general public. This is accomplished through a variety of communications systems by the various exchanges. Transaction information is typically entered by exchange-employed market reporters in each trading pit and is accessible through computer terminals and electronic wallboards on each trading floor. At present the open outcry auction in the pit produces a large quantity of information which must be recorded accurately and quickly by hand.

At the end of each day the clearing house, which may be a subsidiary of the exchange or an independent entity, assumes one side of all open contracts: the clearing house becomes the buyer to each seller of a futures contract, and a seller to each buyer. The clearing house guarantees its members the performance of both sides of all open contracts.

Other aspects of the commodity markets are treated in the literature, which includes Kaufman, "Handbook of Futures Markets," John Wiley & Sons, New York (1984); Rothstein, "The Handbook of Financial Futures," McGraw Hill Book Company, New York (1984); Gould, "The Dow Jones-Irwin Guide to Commodities Trading," Dow Jones-Irwin, Homewood (1981); Goss & Yamey, "The Economics of Futures Trading," John Wiley & Sons (1976); Johnson & Hazen, "Commodities Regulation," Little, Brown and Company, Boston (1989); R. Teweles et al., "The Commodity Futures Game," McGraw-Hill, New York (1974); T. Hieronymus, "Economics of Futures Trading," Commodity Research Bureau, Inc., New York (1971); "Commodity Trading Manual," Chicago Board of Trade, Chicago (1989); and J. Schwager, "A Complete Guide to the Futures Markets," John Wiley & Sons, New York (1984).

Floor traders are generally classified in two ways: (1) speculators, or "locals", buy and sell for their own accounts; and (2) floor brokers fill orders for commission houses, producers and processors seeking to lock in a price for their products. Unless a trader is a member of an exchange, it is necessary for the trader to deal on the exchange through a member brokerage firm. Normally, firms that handle public business (the "commission houses") must be registered as "Futures Commission Merchants", or "FCMs." A "local" can take long-term positions (i.e., weeks or months) or "scalp" over very short periods (liquidating positions within seconds or minutes of entering the transactions). He may trade in one or more pits. He benefits from the speed with which he can take or liquidate positions, but this is in itself no assurance of a profit. Some floor traders specialize in spreads by taking opposite positions between future or options when the price difference appears abnormal. Floor traders have the advantage of lower transaction costs available to all members of exchanges.

The floor traders who execute orders for others but seldom or never trade for themselves are the brokers who may specialize in orders from customers such as commercial processors, exporters, financial institution commodity trading funds and the like. They may receive only a small percentage of the commissions paid by the customer to his commission house, but the commission revenues may be substantial depending on the volume of business. The orders held by a floor broker at any given time are referred to as his "deck." He is allowed to trade for his own account if he chooses, but he can not use the public orders to benefit his own trading.

When a registered representative of the commission house receives an order from a customer, the representative sends the order to the commission house's order desk on the trading floor, where it is usually handed to a messenger and taken directly to an appropriate broker in the trading pit or ring. Once the broker in the trading pit has the order, he typically uses voice and hand signals to announce his bid or offer price, the delivery month, and the quantity to be bought or sold. Once the order has been executed, it is carried by messenger back to the commission house's order desk on the trading floor, and the confirmation of the order is dispatched back to the office where it was initiated. The representative then usually telephones the confirmation to the customer or hands him a confirmation slip if he is present in the office.

The communication of orders from the registered representative to the order desks on the trading floor takes place with great speed. All orders are time-stamped at various stages along the order route as a check that the order is being expedited in the best possible fashion. Increasingly, this process is performed by computerized communications systems which start with a terminal used by the registered representative and end with a printer near the broker. Often the computer simultaneously records the terms of the order for later use in preparing statements for the registered representative and his customer.

The floor brokers' stock in trade is their skill in executing the orders they receive and accept. They must decide, instantly, the tactics that will be most effective in filling a given order: whether to wait for bids or offers, or whether to hold with the current price, or to bid up or offer down promptly. To be effective, they must know the pit: who will do how much at what price. They must read the intentions of scalpers, locals and other brokers while concealing their own intentions.

One of the skills of a broker is in knowing his deck. As described above, the deck is a stack of orders that are to be executed by the broker. The orders are typically written on pieces of paper about five by seven inches which are then arranged by the broker in a sequence for execution as the market price moves up or down. The broker usually folds them for concealment and puts them in his pocket so that his hands will be free to signal and to handle his trading card and pencil. Occasionally, the decks are as much as an inch thick and require great memory skill and anticipatory planning.

Perhaps the most common type of order is the "market order" in which the customer states how many contracts of a given delivery month he wishes to buy or sell. He does not specify the price at which he wants to initiate the transaction but simply wants it placed as soon as possible at the best possible price.

"Contingency orders" are those that impose certain limitations beyond the quantity and delivery month, such as limits in price or time, or both. A "price limit order" contains a price limitation that is specified by the customer; it can be executed only at the price specified or at a better price level. A "fill or kill" order contains a specified price at which the order must be executed or it is to be immediately cancelled.

"Stop orders" are sometimes confused with "limit orders", but they are actually quite different. A "buy stop order" instructs a broker to execute the order when the price of a commodity rises to a specified level above the current market price. The "buy limit order" is usually placed below the current market price and must be executed at the limit price or better. The difference between a buy limit order and a buy stop order is exemplified as follows. A customer may be inclined to buy December sugar, which could be selling at a price of 5.43 cents per pound. The customer could tell his broker to buy a contract at a price not to exceed 5.35 cents; this is a "buy limit order". Another customer under the same circumstances could tell his broker to buy a contract of December sugar but not until the price rises to at least 5.55 cents, at which point the order will be executed at the market; this is a "buy stop order". The buy stop order is placed above the current market and may be executed at the price specified on the stop, above it, or below it because it is executed at the market price after the stop price is touched; at that point, the stop is said to be "elected".

A "sell stop order" instructs a broker to execute an order when the price falls to a given level, at which point it is to be executed at the market price. Unlike a typical "sell limit order", the sell stop order is below the current market price and may be executed at a price at, above, or below the specified stop price when it is elected.

Some customers will raise their stop prices as the market price advances in an effort to gain as much as possible from a major move, while making certain that they can probably lose back only a little of the gain. Such an order is frequently called a "trailing stop".

A somewhat more complex order is the "stop limit order". The customer might instruct his broker not to buy sugar until it rises to 5.53 cents per pound and not to pay more than 5.55 cents. This is unlike the unlimited stop, which becomes a market order when the stop price has been touched. The limit price may be the same or different from the specified stop.

A "market-if-touched (M.I.T.) order" is like a limit order, but the M.I.T. order is executed at the market when the market has traded at the price specified on the order, and so it may be filled either at that specified price, above it, or below it. M.I.T. orders are sometimes called "board orders". The order may be entered for one day, a specified period, or open (i.e., good until cancelled).

Sometimes a customer may wish to take a position within a short time but would like the broker on the floor of the exchange to use some of his personal judgment in the timing of the fill. The broker could do this if the order indicates that he is to fill it at the market but is to take his time and will not be responsible if by waiting too long or not waiting long enough the price is unsatisfactory to the customer. Such orders may be marked "not held". Customers may also specify the time at which they wish their orders filled, e.g., "on opening," "on close," or at a particular specified time.

"Alternative orders" provide for one of two possible executions: a customer may order 5,000 bushels of corn at $1.45 a bushel and 5,000 bushels of wheat at $2.56 a bushel, but not want both. A far more common example of the alternative order is the placing of an objective and a stop, with instructions to cancel one if the other is filled; for example, having bought one contract of soybean oil at 14.50 cents a pound, a customer may order his broker to sell the oil either at 14.95 or 14.25 cents stop, whichever occurs first, and then immediately cancel the remainder of the order to avoid inadvertently reversing his position.

"Scale orders" are used to establish or liquidate positions as the market moves up or down. The sugar trader may instruct his broker to buy a contract of sugar at 5.45 cents and another contract each time the price drops five points from that level until he has accumulated six contracts. When he sells out his position, he may order the broker to sell one contract at 5.70 cents and another contract each time the price rises five points until his six contracts have been sold.

"Contingent orders" are filled by the broker after the price of another contract or even another commodity reaches a specified level.

"Spreads" may be established at a fixed difference rather than at specified prices because the spreader is concerned only with the difference rather than the level. He may therefore order his broker to "buy one July pork bellies and sell one February bellies at 80 points difference or more, premium February." Such an order could be used to establish a new spread position, which the trader believes will narrow, or to take the profit in a position at a narrower difference and be satisfied with the profit at 80 points difference.

Although the foregoing description has concentrated on the commodity futures markets, it will be understood that the order management system of the present invention is applicable to all markets, including those for securities trading. Securities markets are usually based on actions by specialists, each of whom is the market maker for one or more specific securities. In the New York Stock Exchange, for example, the ultimate determination of price for any given transaction frequently is determined by a specialist who deals in a particular stock and who maintains a running list or "book" of offers to sell and orders to purchase that stock. The specialist may complete a transaction in the stock whenever one or more purchase and sell orders can be matched with respect to price; on occasion, the same specialist purchases the particular stock in which he specializes or sells the same stock in order to maintain a market for the stock and prevent violent fluctuations in its price. Similar functions, particularly with respect to the matching of orders to purchase and to sell, must be carried out in all auction markets for the marketing of fungible goods, including such commodities as wheat, corn, and the like as well as stocks and bonds.

A computation system for establishing prices in auction trading for the securities market is described in U.S. Pat. No. 3,581,072 to Nymeyer. That computation system comprises a main data store for recording encoded data items representative of orders to buy and to sell the goods, such orders including orders at specific prices and other orders "at the market." The system includes a buy order sequencing device for arranging and recording purchase offers first in descending order by price and secondly by time of entry so that at each price level the oldest orders are uppermost. A sell order sequencing device is provided for arranging and recording all offers to sell first in ascending order by price and secondly in descending order by time so that once again the oldest orders are the highest at each price level. A closing price store is provided to record the last actual selling price for the goods. The closing price store and the main data store are coupled, by suitable control means, to the sequencing devices in order to transfer the recorded data items from the data store to the sequencing devices with "at market" prices being transferred at the aforementioned last selling price. The two sequencing devices are coupled to a comparator that compares the sell orders and the buy orders, when they have been arranged in sequence, to determine the lowest buy order price that is equal to or greater than a recorded sell order and thus establish a new selling price for the goods.

More than such a system for merely matching buy and sell orders, the present invention provides a system that allows brokers to manage their decks and to improve the accuracy of communications between the trading floor and the customers. The present invention can also reduce the back office costs to trading firms by reducing the volume of paperwork and consequent errors.

SUMMARY OF THE INVENTION

In accordance with the present invention, there is provided a broker workstation for managing orders in a market for trading commodities, securities, securities options, futures contracts and futures options and other items comprising: means for selectively displaying order information; a computer for receiving the orders and for controlling the displaying means; and means for entering the orders into the computer; wherein the displaying means comprises means for displaying selected order information about each incoming order, means for displaying a representation of an order deck and means for displaying a total of market orders.

In another aspect of the invention, there is provided in a workstation having a computer, means for entering order information into the computer and means for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price.

BRIEF DESCRIPTION OF THE DRAWINGS

The features and advantages of the present invention will be better understood after a reading of the following detailed description in conjunction with the drawings in which:

FIG. 1b shows an embodiment of other portions of an apparatus in accordance with the present invention;

DETAILED DESCRIPTION OF THE INVENTION

The broker workstation in accordance with the present invention is an electronic replication of the broker's management of the orders in his deck. The broker has the ability to manage his deck just as he has today in the pits, but more effectively. The present invention facilitates the rapid organization, presentation and exchange of large amounts of order information to a broker without requiring a physical order deck.

As described further below, orders can be entered into the workstation in two ways. The order may be entered directly to the workstation via an electronic order entry system, or it may be entered manually when brought to the pit by a messenger or other signalling. For best utilization of an electronic market trading system such as that described in co-pending U.S. patent application Ser. Nos. 07/322,985 and 07/329,866, the orders are preferably entered by way of the electronic order entry system.

The broker workstation in accordance with the present invention allows the broker to manage the FCMs' orders more efficiently and to handle order acceptances, fill reports and cancel confirmations more effectively. When used with an electronic order entry system, the broker workstation enables the broker to communicate information as to the status of the orders he is working. Therefore, the FCM can track the orders from the time they are entered into the electronic order entry system until the time the orders are returned. The broker workstation can also feed information directly to the customer and clearing house via the electronic order entry system of the exchange. The audit trail is thus enhanced for the FCMs, the broker and the exchange. From the improved procedures provided by the present invention, savings in the form of reduced staff and reduced errors due to manual handling of paper orders can also be expected.

The broker workstation in accordance with the present invention is a deck management system that continues to permit the broker to use his expertise to execute the order depending on the market situation. The broker has indicated on his workstation the different types of orders residing in his deck, including the total quantity at a price of limit orders, stops, stop limits, M.I.T.s, and orders with special instructions. There is also an area indicating the total market orders to buy and sell. Just as in the present markets, the broker must judge how to get the best order execution, whether that is in the physical pits or on an electronic trading system. The system of the present invention thus enables the broker to better serve the needs of the market.

Figure 1A:
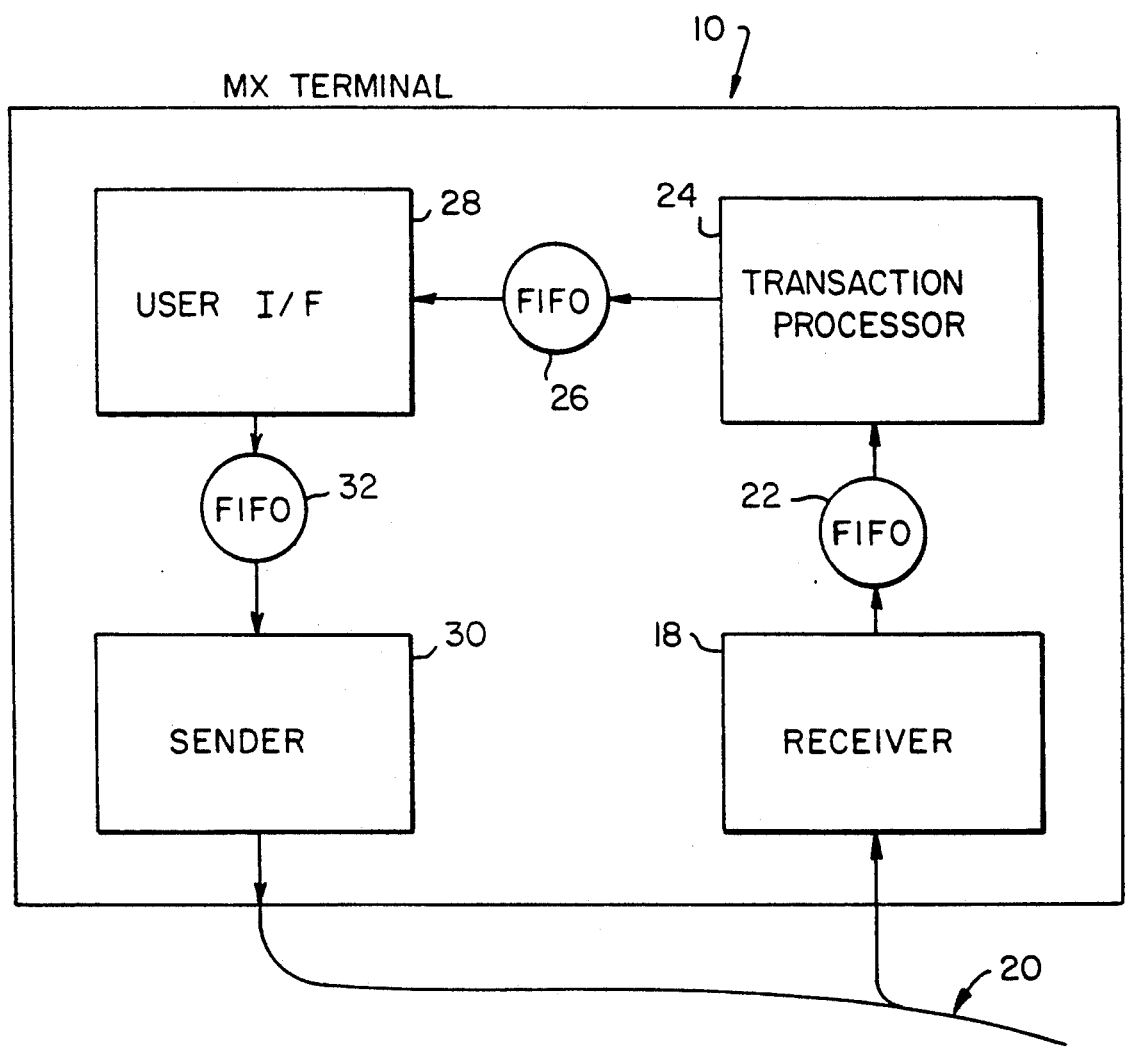
FIG. 1a shows a block diagram of a portion of an apparatus in accordance with the present invention.

Referring now to the Figures in which like reference numerals indicate like parts throughout, FIG. 1a shows a block diagram of an apparatus in accordance with the present invention comprising a broker workstation 10. As described in more detail below, the broker workstation 10 may advantageously be a MICROEXPLORER processor, made by Texas Instruments Inc., that includes a MACINTOSH II computer, manufactured by Apple Computer, Inc., having a high-resolution (e.g., 350 dots per inch), color, touch-sensitive display screen. Suitable touch-sensitive screens are made by Apple Computer, Inc, and it will be appreciated that many other suitable devices are commercially available. One embodiment of a broker workstation 10 is illustrated in FIG. 1b which shows a high-resolution display screen 12, a keyboard 14 and an auxiliary control device 16, such as a trackball or mouse. It will be understood by those of ordinary skill in the art to which the present invention pertains that the various keys and touch-sensitive screen functions can also be implemented by a conventional keyboard, mouse and other standard input devices.

The workstation 10 carries out a plurality of instruction modules that can be written in any suitable computer language, such as LISP, PASCAL and C, although LISP is preferable because of the flexibility it provides. In addition, the broker workstation 10 shown in the block diagram of FIG. 1a is representative of a plurality of broker workstations that may be operational simultaneously.

A workstation receiver module 18 receives suitable communications from an electronic order entry system and price reporting system that are provided by the exchange and are electronically connected to the workstation 10 by a suitable link 20. The receiver module 18 is thus a port into the workstation 10, which may be activated initially by an attempt at connection by the order entry system. It will be understood that connection of the workstation 10 to an electronic price reporting system would be made in a manner substantially similar to the connection to the electronic order entry system and that the communication link 20 may comprise any of the well known hard-wired, radio-frequency or optical technologies.

In operation, the workstation receiver module 18 receives orders and other information directed to the workstation and electronically attaches or associates that information with a time of receipt indication. Such time stamping is important for audit and integrity functions of the system, as well as for carrying out order-matching features of some types of trading system. The received order and time-stamp are then stored temporarily in a workstation-in queue 22 in the workstation receiver module 18, and the module 18 causes the workstation 10 to send an acknowledgment of receipt to the transmitting order entry system. In some situations, the workstation receiver module 18 would cause the workstation 10 to send a not-acknowledged message to the order entry system so that the information could be retransmitted. Such situations would typically occur when the workstation-in queue 22 is temporarily full or when an error in the format of the information occurs, such as might arise from a noisy communication link.

The workstation receiver module 18 receives the information from the order entry system and places it in the workstation-in queue 22 in a predetermined time sequence. The receiver module 18 thus could advantageously arrange for processing of information from an electronic order entry system before processing of information entered by hand despite the earlier receipt of the hand-input information. For example, orders from a trader in Japan could be presented to a Chicago-located broker workstation before orders flashed by hand from a Chicago trader to the broker are processed. In this way, communications link delays could be compensated by the system so that the system access time is equal for all traders, but such access time equalization is not essential to the present invention. It will be appreciated that such delay compensation would not be expected in applications in which the workstation 10 received orders through a plurality of different electronic order entry systems used by different FCMs. In addition, the receiver module 18 can implement the features of the present invention for organizing information in price and time sequences as in stock-exchange and other types of trading system.

After time-stamping the received information, the workstation receiver module 18 places the information in the workstation-in queue 22, such as a FIFO buffer, and transmits an acknowledgement message to the order entry system. If the workstation-in queue 22 is full or if an error in the information is detected by the workstation receiver module 18, the module 18 transmits a not-acknowledged message to the order entry system. The workstation receiver module 18 also handles an "alive" or "heartbeat" message from the workstation 10 to the order entry system in the event of little market activity.

Information in the workstation-in queue 22 is removed by a workstation transaction processor 24 which time-stamps the information and updates the workstation's display screen and database, which may be stored on a hard disk memory, in accordance with the information through a FIFO buffer 26. As described in more detail below, those updates reflect market activity and certain other information that may be selectively determined by the broker.

The information in the FIFO 26 presented to the workstation user and information input to the workstation 10 by the user are transmitted through a workstation user interface module 28. The module 28 has been designed using the ACTION! software development tool available from Expertelligence, Inc. The ACTION! tool greatly facilitates the writing of window-type code for controlling the display screen of the MICROEXPLORER processor. The module 28 carries out a suitable log-in procedure to the workstation 10, thereby causing the workstation to initialize the broker workstation with suitable information from the workstation database and the electronic order entry system.

After the broker workstation 10 is initialized via the workstation broker interface module 28, a workstation sender module 30 establishes communication with the electronic order entry system through communications link 20. The sender module 30 removes data from a workstation-output queue 32, such as a FIFO buffer, attaches a workstation address and time-stamp and communicates the information to the order entry system. When the workstation-output queue 32 is empty for a predetermined time period, the sender module 30 transmits a suitable workstation "alive" or "heartbeat" message to the order entry system. The sender module 30 is also responsive to the acknowledge, not-acknowledge and other suitable error messages received at the workstation from the electronic order entry system.

In a preferred embodiment, a large proportion of the instructions for carrying out the order management system of the present invention are written in LISP or C or another suitable programming language and are resident in the broker workstation 10. In this way, the system's programming is easy to accomplish and the volume of communications from the workstation is minimized. It will be understood that subdividing the tasks of the workstation instructions into LISP objects in the manner described significantly minimizes the complexity of and effort necessary for the implementation of the present system.

Figure 3:
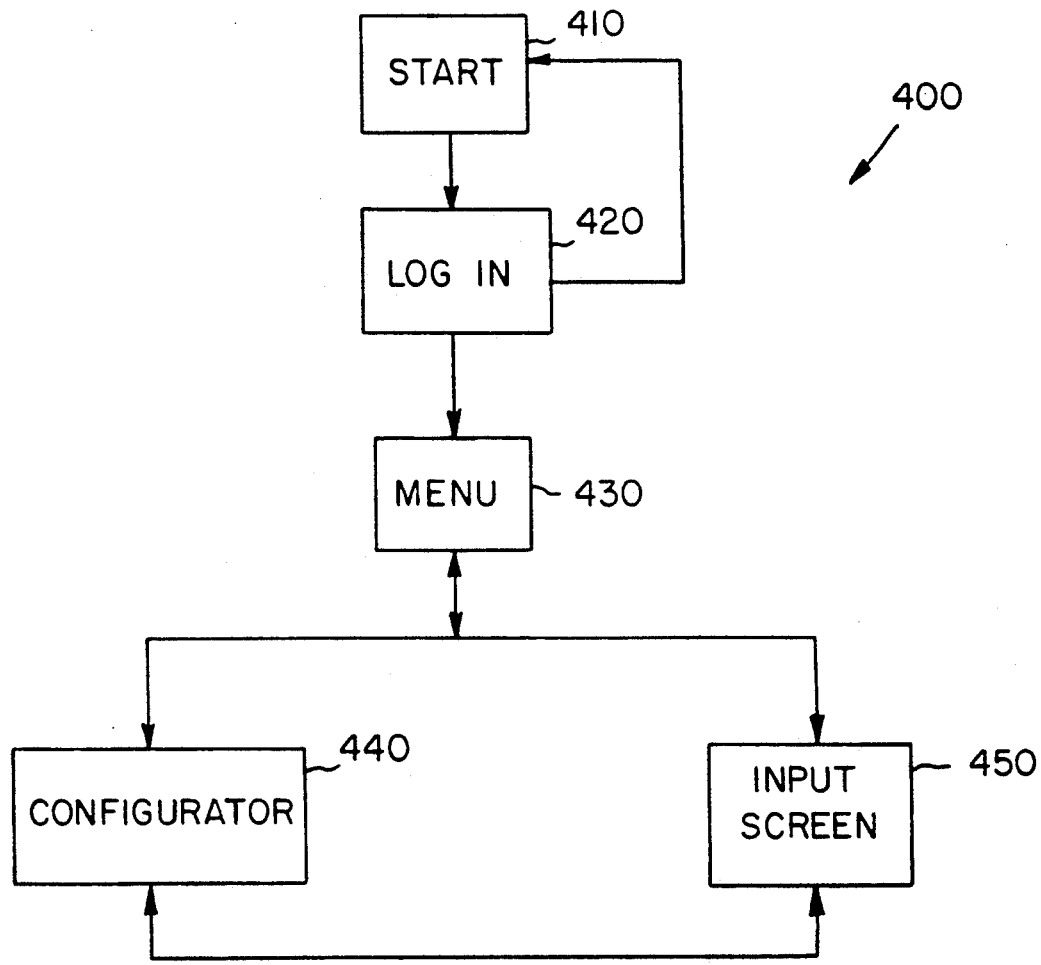
FIGS. 3 and 3a show functional block diagrams of the broker workstation instructions.

Referring to FIG. 3, which is a block diagram of the organization of the instructions included in each broker workstation 10, the instructions 400 resident in a workstation advantageously comprise a plurality 410–450 of "objects", as they are conventionally referred to in LISP programming, or "applications", as they are referred to when using the ACTION! software development tool kit. It will be understood that "objects" and "applications" correspond generally to "subroutines" in other programming languages. They include data and logic structures, including suitable pointers and other indexes, that enable execution of user requests and direct the logical flow of program execution among several "objects." Although described in terms of a futures market, it will be understood that the organization of the instructions for a stock, bond or other securities market would be substantially similar.

The START SCREEN application 410 is a LISP object which is executed automatically at turn on of a broker workstation 10. The START SCREEN application 410 verifies proper initialization of the workstation 10 and queries the broker whether logging into the system is desired.

The LOGIN application 420 is executed in response to an appropriate broker input, whether via mouse, trackball, touch-screen, keyboard or other entry means. The LOGIN application 420 queries the broker for his user name and for his password for review. If the user name and password are authorized for access, the LOGIN application 420 responds by transferring execution to the MENU application 430. If authorization is denied, e.g., because the authorized user had previously requested his workstation to be "locked out" during his vacation, execution is returned to the START SCREEN application 410.

Once access to the broker workstation 10 is granted, the MENU application 430 queries the user as to which of the other applications, i.e., CONFIGURATOR 440 and INPUT SCREEN 450, is desired. As described further below, the interrelation of the applications 430–450 is such that logical execution of the workstation instructions can move rapidly and easily among the applications.

The CONFIGURATOR application 440 implements the aspects of the present workstation relating to the user-definability of the workstation. Those features are advantageous because, for example, some brokers may be concerned only with orders of particular types and others may be concerned only with contracts of a particular quantity. Thus, as described in more detail below, each broker could "customize" his workstation to receive and display such selected orders, and the application 440 includes LISP objects for providing those and other desirable features, and for quitting the CONFIGURATOR application 440 and returning to one of the other applications.

Figure 2A:
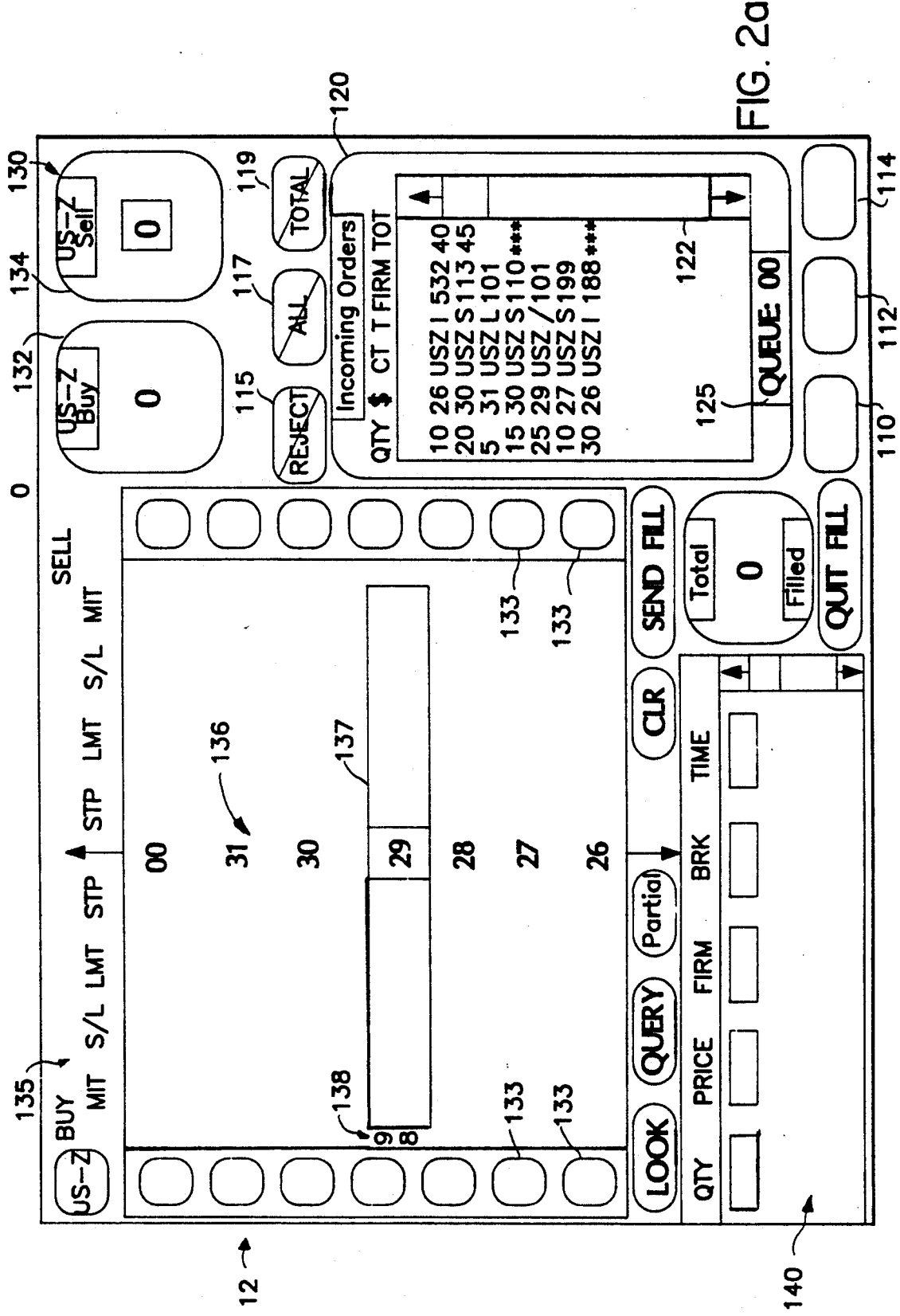
FIGS. 2a, 2b, 2c and 2d show display partitions in accordance with present invention.
Figure 3A:
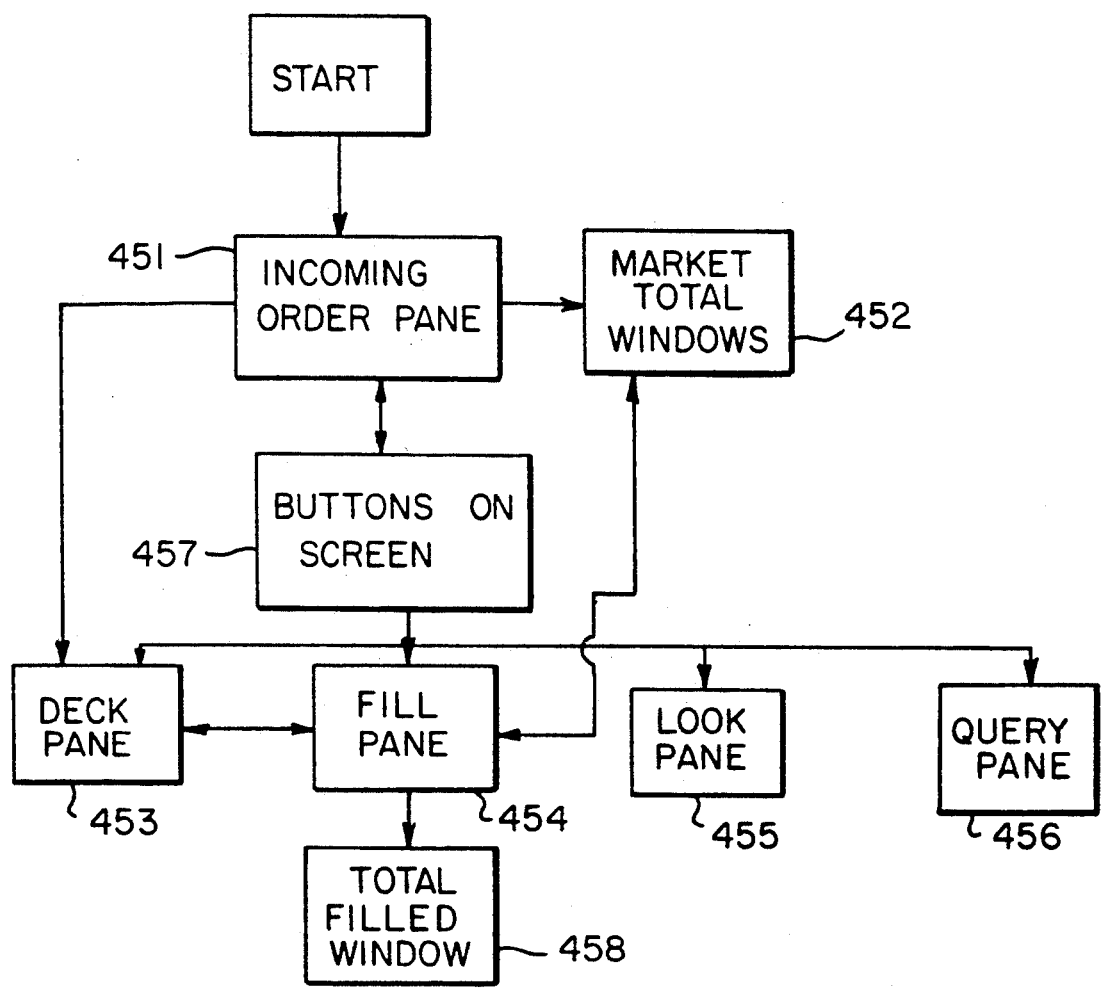

The INPUT SCREEN application 450 is the LISP object which implements the deck management features of the present invention and generates a number of pop-up windows, or panes, on the display screen 12. A preferred partitioning of the display screen 12 generated by the INPUT SCREEN application 450 is shown in FIG. 2a. Referring to FIG. 3a, the INPUT SCREEN application 450 advantageously comprises (1) an Incoming Order Pane object 451 for creating an incoming orders pane 120 on the display screen, (2) a Market Total Windows object 452 for creating a market orders pane 130, (3) a Deck Pane object 453 for creating a deck pane 135, (4) a Fill Pane object 454 for creating a fill pane 140, (5) a Look Pane object 455 for creating a look pane 145, (6) a Query Pane object 456 for creating a query pane 150, (7) a Buttons On Screen object 457 for creating several touch-sensitive areas (described in more detail below) on the display screen and a Total Filled Window object 458 for creating a TOTAL FILLED window in the fill pane 140.

The Incoming Order Pane object 451 controls the reception by the workstation 10 of orders input via the electronic order entry system or by hand and generates alphanumeric legends and displays of selected information on each order in a columnar, line-by-line format. As shown in FIG. 2a, the selected information about each incoming order (seven of which are shown in the figure) includes the quantity (shown in the QTY column), price ($ column), contract and month code (CT column), order type (T column), sending commission house or firm (FIRM column) and the total number of contracts at that price for all incoming orders (TOT column). Because of the fixed size of the incoming orders pane 120, a touch-sensitive scrollbar 122 is generated by the Incoming Order Pane object 451 at the right side of the incoming orders pane 120 for scrolling the list of orders.

The Incoming Order Pane object 451 also generates a queue portion 125 at the bottom of the incoming order pane 120. Shown in the queue portion 125 is the number of orders (zero is shown in the figure) that have been received by the workstation 10 but that are not displayed in the incoming orders pane 120 because of the pane's fixed size. The queue number is updated as the orders enter and leave the incoming orders pane as described further below.

After an incoming order is received in the incoming orders pane 120, the broker can either accept or reject it by touching the order information line, which is then highlighted in response, and then touching the ACCEPT 110 or REJECT 115 "buttons" on the touch-sensitive screen 12. As described in more detail below, the "buttons" 110 and 115, as well as the other "buttons" generated by the workstation 10, are created by the Buttons On Screen object 457. Touching the ACCEPT button 110 causes the selected order information in the incoming orders pane 120 to appear as an order icon in the deck pane 135. It will be appreciated that the information displayed in the incoming orders pane 120 is sufficient to enable the broker to decide to accept or reject orders. If the broker wishes to obtain more information on an order, it can be obtained through the look pane 145 that is described in more detail below. ALL "buttons" 112 and 117 and TOTAL "buttons" 114 and 119 are associated with the ACCEPT and REJECT buttons 110 and 115 by which the broker can simultaneously accept or reject a plurality of orders in the incoming orders pane 120 with a minimum of keystrokes. As described further below, the workstation may be configured to accept incoming market orders automatically, thereby avoiding the need for action by the broker. The ACCEPT and REJECT buttons and their respective ALL and TOTAL buttons are advantageously shown in green and red, respectively, and an additional visible indicator, such as a diagonal slash, is shown in the REJECT-type buttons to compensate for possible atypical color perception.

As described above, the incoming orders pane 120 displays information describing orders that have been communicated to the broker workstation via an electronic order entry system, and includes a scroll bar 122 for moving among the incoming orders. In a preferred embodiment, the information on each incoming order is presented in a one-line format, including the order's type (e.g., market (K), stop (S), limit (L), stop/limit (/) or M.I.T. (M)), the quantity ordered, the commodity or instrument (e.g., USZ can refer to U.S. Treasury bonds having a December maturity), the price and an identification number of the commission house or other trader placing the order. The incoming orders are advantageously presented in time-of-receipt sequence with the oldest orders listed first. In addition, the orders may be grouped and color-coded such that orders having the same makeup, i.e., all buys or sells of the same commodity and price, can be quickly identified and collectively acted upon if desired. For example, it is advantageous to show buy orders in blue and sell orders in red, and to outline the incoming orders pane 120 in a contrasting color such as green. As described elsewhere, such color selection contributes to the ease of use of the invention.

To conserve screen area, it will be noted that the "handle", or whole-dollar amount of the price need not be shown in the line-format order information. In addition, the totals of all incoming orders at the same prices that are shown in the TOT column can be presented only with the first listed orders having such prices; later listed orders can have asterisks or other characters shown as the TOT column entries, and orders having prices that are unique among the incoming orders can have blanks.

The Market Total Windows object 452 generates the market orders pane 130 which is advantageously divided into a buy area 132 and a sell area 134, shown in blue and red, respectively. Each area includes a legend for identifying the area and the instrument or commodity to which it relates (e.g., the displays "US-Z" indicate U.S. Treasury bonds having a December maturity) and the total of the market orders for the instrument or commodity. When the broker accepts a market order, it is removed from the incoming orders pane, and the quantity in the buy or sell area, as appropriate, is updated.

As shown in FIG. 2a, the deck pane 135 created by the Deck Pane object 453 is organized into a buy side and a sell side and comprises a dividingly positioned column 136 of price ticks, each of which may indicate 1/32 of a dollar (as shown) or another amount as appropriate to the commodity or instrument being traded. Also included in the deck pane 135 is a market bar 137 which is advantageously a highlighted portion shown in blue that is positioned at the current trade price of the commodity in response to information communicated to the workstation 10 by the exchange's price reporting system. Because only the price ticks are shown in the column 136 to avoid screen clutter, the handle 138 of the market price is indicated at the left side of the market bar 137. The market bar 137 moves up and down along column 136 in response to changes in the market price, as described in more detail below. When a broker accepts an order other than a market order, the order is removed from the incoming orders pane and appears in the deck pane under the appropriate price type at the appropriate price level. Buy orders are represented in the deck pane as blue square shapes, and sell orders are represented as red circles, both of which include indications of the quantities of the orders represented.

Figure 2B:
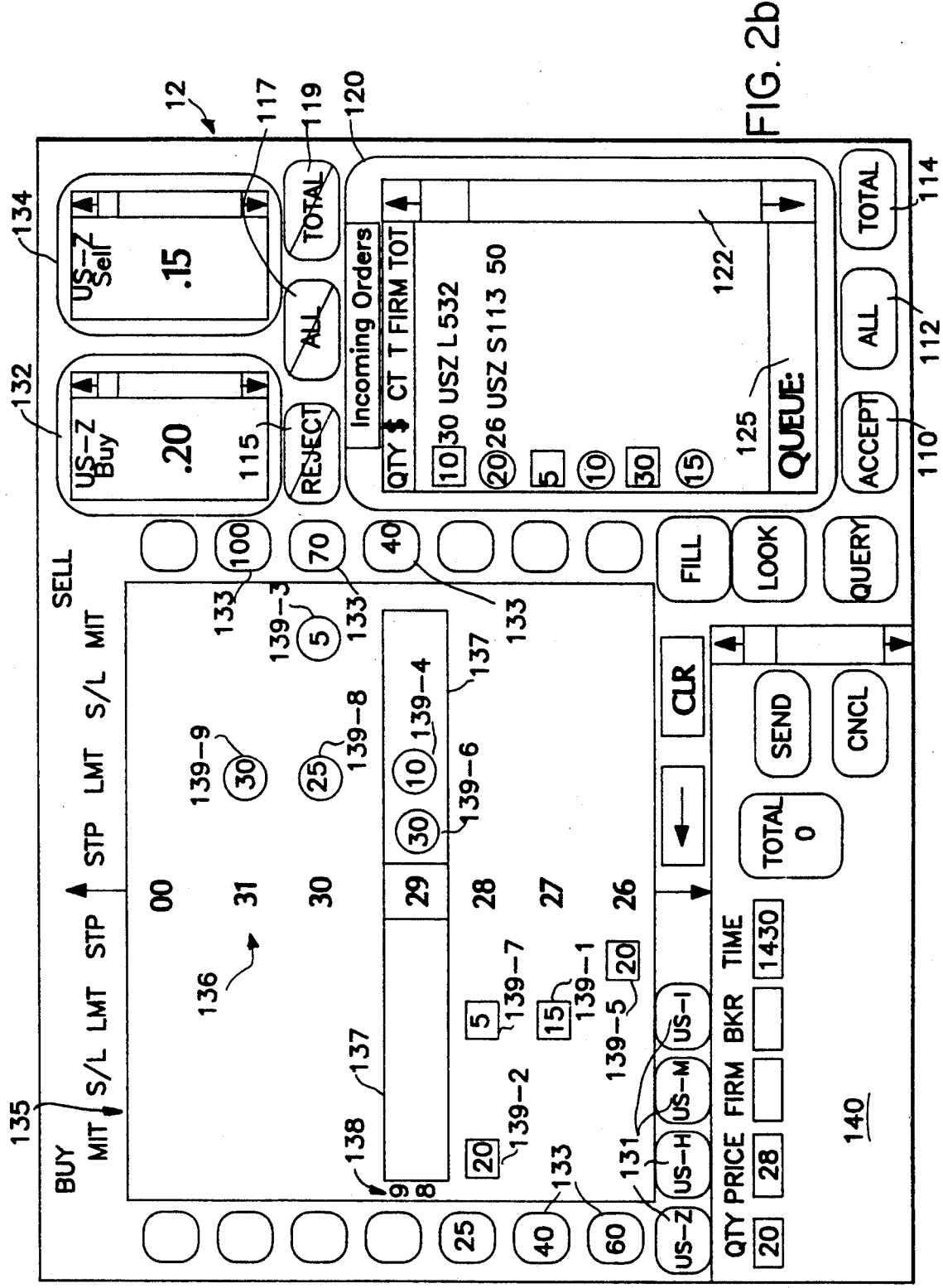

The deck pane 135 further comprises icons 139 representing orders that have been accepted by the broker. These order icons are created by suitable icon-objects and are displayed in deck pane 135 in positions that are determined by the types and prices of the orders. As seen in FIG. 2b, for example, nine orders are shown in the deck pane 135: icons 139-1 and 139-7 represent limit buy orders for 15 at a price of 98 and 27/32 and 5 at 98 and 28/32, respectively; icon 139-2 represents a M.I.T. buy order for 20 at 98 and 28/32; icon 139-3 represents a M.I.T. sell order for 5 at 98 and 30/32; icons 139-4, 139-8 and 139-9 represent limit sell orders for 10 at 98 and 29/32 (the current market price as indicated by the market bar 137), 25 at 98 and 30/32 and 30 at 98 and 31/32, respectively; and icons 139-5 and 139-6 represent buy stop and sell stop orders for 20 and 30 at 98 and 26/32 and 98 and 29/32, respectively. As described in more detail below, each order icon 139 is advantageously a touch-sensitive area that is employed in cooperation with other aspects of the screen 12. The deck pane 135 further includes column headings for identifying the types of orders, and a plurality of order-total displays 133 disposed around the periphery of the deck pane. Each order-total display 133 corresponds to a respective price tick 136 and displays the total of orders in the deck at and better than its respective price tick. The deck pane 135 further includes touch-sensitive up and down arrows disposed at the extremes of the price tick column 136, which are created by arrow-objects controlled by the Deck Pane object 453, for scrolling the range of prices and the order icons 139 displayed in the deck pane 135.

The manner in which the market bar 137 moves with each change in price can be selectively determined by the broker through the operation of the CONFIGURATOR object 440 based on the nature of typical price movements in the commodity being traded. For example, the movement of the market bar 137 in response to rapid, small (one or two price ticks) price changes could be confusing if the market bar 137 were arranged to follow each price tick. A preferred manner for implementing the market bar 137 is to have the bar cover the last two prices traded; a second preferred manner is to have the market bar move only after the price has changed two or three price ticks. It will be appreciated that other manners of implementing the market bar 137 to realize the bar's function of indicating the current market price are also possible.

Figure 2C:
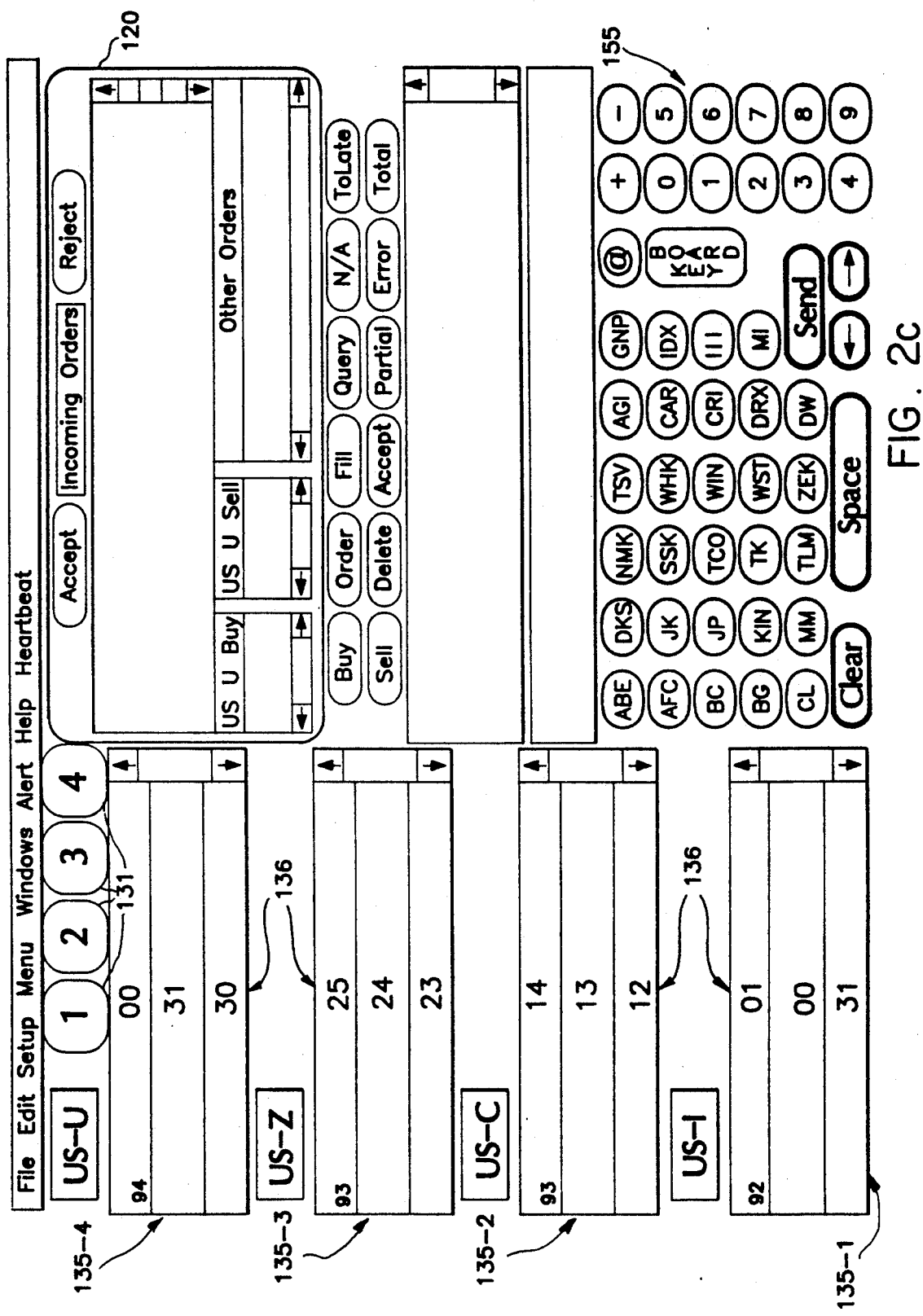

The deck pane 135 can be selectively partitionable so that a plurality of decks can be simultaneously displayed, as illustrated in FIG. 2c. The deck pane 135 is shown partitioned into four deck areas 135-1, 135-2, 135-3 and 135-4, each corresponding to a different commodity or instrument traded by the broker. Because the screen 12 has only a fixed size, the number of price ticks shown in the columns 136 in each deck area is reduced, but the other components of the deck pane described above are provided in each of the four deck ares. Also at the upper part of the deck pane 135 (as shown in FIG. 2c) or at the lower part of the deck pane (as shown in FIG. 2b) are touch-sensitive areas 131 shown in colors for selectively calling up each deck area onto the full deck pane. The other portions of FIG. 2c show alternate embodiments of the incoming orders pane 120 and other elements of the screen display 12, including a touch-sensitive keyboard area 155 having a plurality of "buttons" which may be dedicated to predetermined brokers or FCMs according to their identification information as shown or provide a conventional alphanumeric keyboard capability.

After an order is executed, the broker selects the order by touching the corresponding order icon in the deck pane 135. When the order is selected, the icon is highlighted, and the order's quantity, price and time stamp appear in so-designated areas of the fill pane 140 which "pops up" into the lower left portion of the screen 12 by the operation of Fill Pane object 454. The broker enters the identification code of his counterpart broker and firm by means of the keyboard 14 or other suitable data entry device and presses the SEND FILL "button" on the screen 12. The workstation 10 then communicates the filled order information to the customer and clearing house via the electronic order entry system. In periods of heavy market activity, the broker could delay entering the counterpart broker and firm information to expedite the reporting of the order execution to the customer. A touch-sensitive scroll bar is also provided in the fill pane 140 for reviewing sequences of order information when several small orders are used by the broker to fill large orders.

In cases where the broker executes a large order through more than one counterpart order, a PARTIAL "button" and a TOTAL FILLED area are provided in the fill pane 140 shown in FIG. 2a. As described above, the PARTIAL "button" is created by the Buttons On Screen object 457, and the TOTAL FILLED window is created by the Total Filled Window object 458. After touching the order icon in the deck pane 135, the broker would touch the PARTIAL button, and the order's price and time stamp would appear in the fill pane 140, as described above, and the quantity would appear in the TOTAL FILLED area. The broker would then enter the quantity and identification codes of the counterpart broker and firm for the first order, the TOTAL FILLED amount would decrement by that quantity, and another line of information entry area would appear in the fill pane. The broker would then enter the quantity and identification codes of the counterpart broker and firm for the second order, and the TOTAL FILLED amount would decrement accordingly. Successive lines for information entry would appear in the fill pane until the broker entered orders having a total quantity equal to or greater than the large order being filled. If the broker pressed a QUIT FILL "button" to indicate that order fill input was complete before sufficient small orders had been entered, the PARTIAL button would flash or another indication of incomplete entry could be given.

Figure 2D:
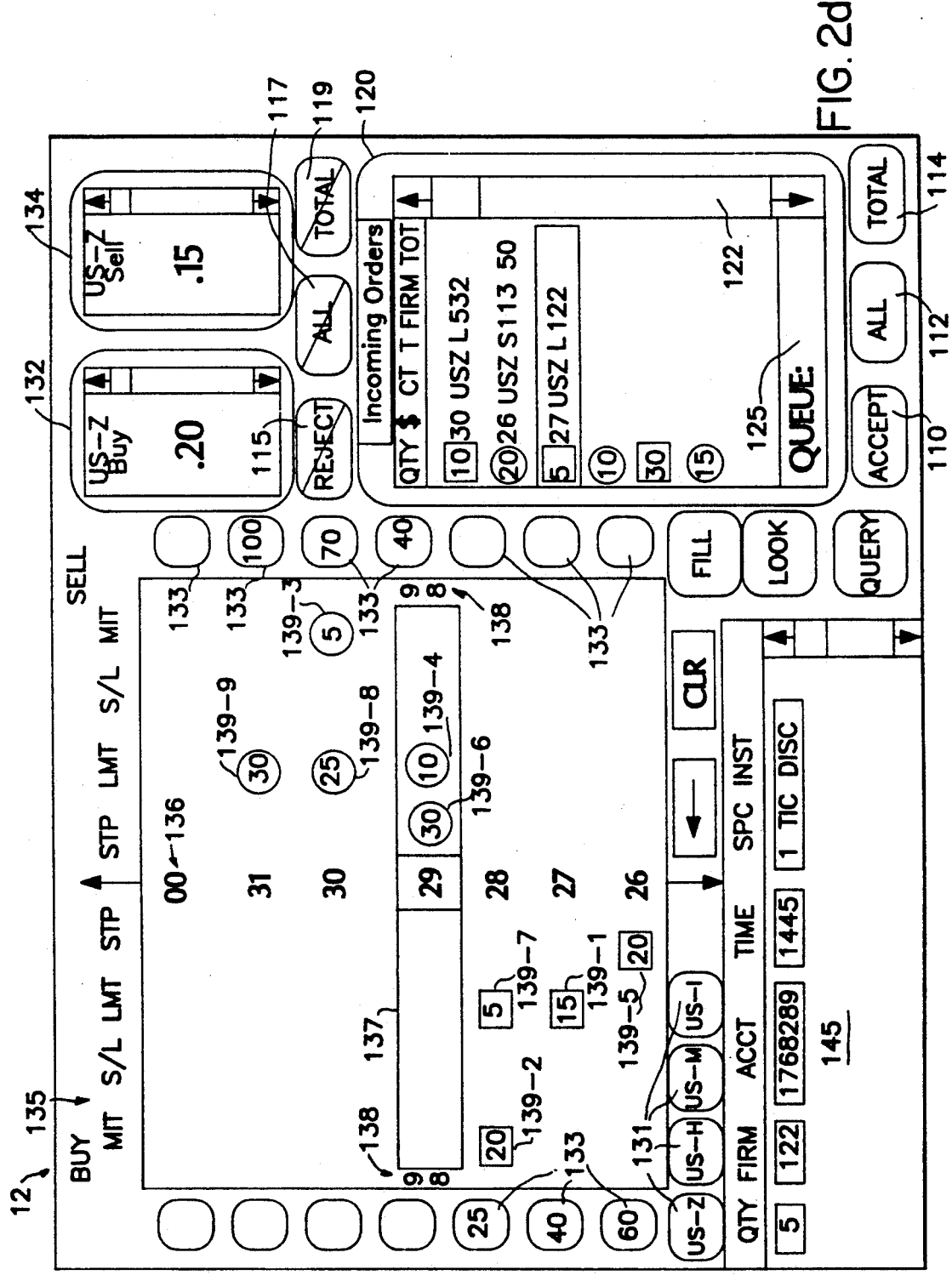

Due to the fixed size of the screen 12, the incoming order pane 120 provides only the minimum amount of information believed necessary for the broker to decide whether to accept or reject an order. The broker can access more detailed information by selecting an order for review, for example, by touching the corresponding order icon in the deck pane 135 or the corresponding order information in the incoming orders pane 120, and pressing the LOOK "button" on the screen 12. The look pane 145 "pops up" in the same area of the screen as the fill pane 140, as illustrated in FIG. 2d, in response to the operation of the Look Pane object 455, and would preferably present any information about the selected order that was available to the order entry system but not displayed. In the case of incoming orders, such information could identify the order as being discretionary, the trader's account number and any special instructions.

In a manner similar to the display of the fill pane 140 and the look pane 145, the workstation 10 provides additional information on the history of selected orders by operation of the Query Pane object 456 that is initiated by pressing the QUERY "button" on the screen 12. A query pane then "pops up" in the same area of the screen 12 as the fill and look panes. The information that would be presented in the query pane would advantageously include information concerning orders that had arrived in the workstation that day, such as previously rejected orders, accepted-and-filled orders and pending orders. The information displayed would preferably be searchable by broker and firm identification codes, order type, price, quantity, time etc.

It will be understood that conventional display screen 12 is preferably touch-sensitive over a substantial portion of its surface area, thereby permitting great flexibility in the positioning of the several "buttons" described above created by Buttons On Screen object 457. "Buttons" are conventionally generated by suitable buttonobjects which define the height, width, position and subroutine or other object to be called when the "button" is touched.

It will be understood that the organization of order information presented on the screen 12 may be similarly adapted to the needs of stock, bond, stock option and other commodity trading as desired.

The shapes and colors of the icons representing orders are selected to convey a substantial amount of pertinent information. In a preferred embodiment, an order from a trader who is bidding is represented by an icon which is a blue square or other polygon. An order from a trader who is offering is represented by an icon which is a red oval or other curved shape.

Other important information conveyed by the order icons is the quantity ordered. This information is provided by including a numeric string for the order quantity in each icon. It will be appreciated that the content of the order icons is adapted to display the information needed by the broker.

As described above, the display screen 12 may be suitably reconfigured by operation of the CONFIGURATOR object 440 according to the user's preference to show one or all of a plurality of decks that might be handled by the user. As shown in FIG. 2c, the deck pane 135 can include four deck areas. It will be understood that other configurations of the screen are also possible according to the type of market to be displayed. For example, two decks could be displayed for brokers carrying out spread trading.

It will be understood that the foregoing description is illustrative only and that one of ordinary skill in the art will recognize various modifications which do not depart from the spirit and scope of the invention that are to be limited solely by the following claims.

What is claimed is:

1. A broker workstation for managing buy and sell orders submitted to a broker from a plurality of customers for execution in a commodities, securities, securities options, futures contracts or futures options exchange, comprising:

a first means for displaying information concerning a plurality of unexecuted orders submitted to a broker from a plurality of customers for execution, each of said unexecuted orders comprising a quantity of a particular commodity, security, option or contract to be bought or sold;

a computer for receiving order information, for controlling said first displaying means, and for calculating a total of said unexecuted orders for a particular commodity, security, option, or contract at the market price; and means for entering data into the computer, said data comprising information concerning incoming orders submitted to a broker from a plurality of customers for execution;

wherein said first displaying means comprises means for displaying selected information about each incoming order, means for displaying selected information concerning orders that have been accepted for execution, and means for displaying said total of unexecuted orders.

2. The workstation of claim 1, wherein the entering means includes means for receiving order information from an electronic order entry system.

3. The workstation of claim 1, wherein the accepted order displaying means comprises a price tick column and a market price bar for indicating the market price, and first and second types of order icons, the first type of order icon representing sell orders and the second type of order icon representing buy orders.

4. The workstation of claim 3, wherein the accepted order displaying means comprises a selected plurality of price tick columns and market price bars for indicating market prices in a plurality of markets.

5. The workstation of claim 3, wherein the first and second types of icons are different colors and shapes, and each order icon indicates the quantity of the order represented.

6. The workstation of the claim 1, wherein said first displaying means further comprises means for selectively displaying order fill information and said data entering means comprises means for entering order fill information.

7. The workstation of claim 1, wherein said first displaying means further comprises means for selectively displaying detailed information about selected incoming orders.

8. In a workstation having a computer, means for entering data into the computer, and means for displaying the data entered, a method for managing buy and sell orders submitted to a broker from a plurality of customers for execution in a commodities, securities, securities options, futures contracts or futures options exchange, comprising the steps of:

entering data into the computer, said data comprising information concerning incoming orders from a plurality of customers to be executed by a broker;

displaying selected information concerning a plurality of unexecuted orders, each of said unexecuted orders comprising a quantity of a particular commodity, security, option or contract to be bought or sold;

accepting or rejecting orders corresponding to the incoming order information;

displaying selected information concerning orders that have been accepted for execution; and calculating a total of said unexecuted orders for a particular commodity, security, option, or contract at the market price and displaying said total.

9. The method of claim 8, wherein the accepted order displaying step comprises the steps of indicating the market price by a price tick column and a market price bar and representing the accepted orders by one of first and second types of order icons, the first type representing sell order and the second type representing buy orders.

10. The method of claim 9, wherein the accepted order displaying step comprises the step of displaying a selected plurality of price tick columns and market price bars for indicating market prices in a plurality of markets.

11. The method of claim 9, wherein the first and second types of order icons have different colors and shapes, and each order icon indicates the quantity of the order represented.

12. The method of claim 8, further comprising the steps of entering order fill information and displaying the order fill information entered.

13. The method of claim 8, further comprising the step of selectively displaying detailed information about selected incoming orders.

* * * * *